United States Patent Office 3,705,924
Patented Dec. 12, 1972

3,705,924
VAPOR PHASE PROCESS FOR PRODUCING
VINYL ALLYL ETHER
Robert A. Smith, Anaheim, and Ting-I Wang, Fullerton,
Calif., assignors to Atlantic Richfield Company, Philadelphia, Pa.
Filed July 15, 1969, Ser. No. 841,735
Int. Cl. C07c 43/00, 43/16
U.S. Cl. 260—614 R                     1 Claim

ABSTRACT OF THE DISCLOSURE

Vinyl allyl ether is produced by the vapor phase catalytic conversion of diallyl acetal to allyl vinyl ether using selected catalysts including silica gel, molecular sieves, aluminum phosphate, charcoal, alumina, and disodium phosphate. Certain catalysts including glass beads, Alundum, $H_2SO_4$ on silica gel and NaOH on silica gel do not produce the allyl vinyl ether in the process disclosed.

CROSS-REFERENCE TO RELATED APPLICATION

The invention described in this application constitutes a modification of the invention described in the copending application Ser. No. 841,984 of Glenn M. Nakaguchi and Ting-I Wang, "Vapor Phase Process for Producing Allyl Vinyl Ether," filed July 15, 1969, and now abandoned.

BACKGROUND OF THE INVENTION

Field of the invention

This invention relates to a novel process for preparing 1-alkenylalkenyl ethers and, more particularly, to a process for preparing allyl vinyl ether by the vapor phase catalytic conversion of diallyl acetal.

Description of the prior art

Vinyl allyl ethers were first described by Hurd and Pollack, "The Rearrangement of Vinyl Allyl Ethers," 60 J. Am. Chem. Soc. 1905–11 (1938). Vinyl allyl ethers have come to be known as useful intermediates in the production of chemical compounds and as monomers for the production of useful polymers and copolymers. The polymerization of vinyl allyl ether to produce a shiny, hard film having good solvent and temperature resistance is described by Paul, et al. Vinyl Allyl Ether and its Polymerization Products, 1950 Bull. Soc. Chim. France 121–7. Copolymers have been described by Gast et al., "Polymers From Poly-unsaturated Fatty Vinyl Ethers and Certain Cross-linking Monomers," 20 Am. Chem. Soc. Div. Paint, Plastics, Printing Ink Chem. 371–6 (1960) and by Barney et al., "Free Radical Polymerization of Thiocarbonyl Fluoride," J. Polymer Sci., PT A–1, 4(10), 2617–36 (1966). Other uses of vinyl allyl ether and method of using this compound are described in U.S. Pats. 2,603,628, 2,825,719, 2,830,032, 3,021,373 and 3,025,275, in British Pat. 911,960 and in French Pat. 1,399,221.

Vinyl allyl ether is thermally a relatively unstable compound and readily undergoes a Claisen-type rearrangement to the pentene aldehyde. This type of reaction of vinyl allyl ether is discussed by Hurd and Pollack, supra, by Pocker, "The Gas-Phase rearrangement of Allyl Vinyl ether," 1961 Proc. Chem. Soc. 141–2 and by Julia, et al., "Thermal Transportation of Allyl Vinyl Ethers for the Synthesis of Some γ,δ-Ethylenic Aldehydes and Ketones," 1962 Bull. Soc. Chim. France 1947–52. The reaction kinetics have been studied by Schuler and Murphy, "The Kinetics of the Rearrangement of Vinyl Allyl Ether," 72 J. Am. Chem. Soc. 3155–9 (1950).

It is known to produce alkyl vinyl ethers in the gas phase. Wichterle, et al., "Laboratory Preparation of Vinyl Esters by Fission of Acetals Under Diminished Pressure," 26 Collection Czechoslov. Communs. 1099–1104 (1961) describes a process for producing vinyl allyl ethers over a carbon-$CuSO_4$ catalyst. Methyl, butyl, isobutyl and tolyl vinyl ethers were produced at temperatures ranging from 260° C. to 300° C. Tolyl ether was produced in low yields because of product decomposition at the temperatures necessary for carrying out the synthesis reaction. British Pat. 603,471, June 16, 1948, describes a process for converting acetals to vinyl ethers by thermal disassociation in the vapor phase in the presence of a volatile strong mineral acid. $SO_3$, HCl, diethyl sulfate, ethyl hydrogen sulfate, and isopropyl sulfate are reported to have catalytic action at temperatures of about 350° C. under partial vacuum. The production of vinyl ethers from unsymmetrical acetals has been reported by Degarlais, et al., "Preparation of Some Ethyl Higher-Alkyl Acetals and Their Conversion to Vinyl Ethers," 38 J. Am. Oil Chemists Soc. 241–43 (1961), Ethyl fatty acid acetal was cleaved over bentonite or kaolin at 195 to 350° C. but the yields were low and it was found that the vinyl ethers produced were relatively unstable at these temperatures. Rearrangement of ethyl stearoyl acetal to diethyl acetal occurred over p-toluene sulfonic acid at 130–135° C. Stearoyl vinyl ether was produced, however, over sulfanilic acid in vacua at 135° C.

Deschamps, et al., "Preparation of α-Ethylenic Ethers From Acetals," 238 Compt. Rend. 2006–7 (1954) reported the formation of vinyl ethers by passing the corresponding acetal over kaolin at 300° C. A similar process using an asbestos-boric acid catalyst at 250° to 500° C. is reported in U.S. Pat. No. 1,902,169, Mar. 21, 1933, and the production of methyl, ethyl, propyl, butyl, isobutyl and isoamyl vinyl ethers has been reported by the catalytic pyrolysis of the respective acetals at 400° C. by Cabanac, "The Catalytic Decomposition of Acetals by Metallic Oxides," 190 Compt. Rend. 881–2 (1930).

Thus, while the prior art teaches the vapor phase catalytic conversion of certain alkyl acetals to vinyl ethers the results of such processes are highly unpredictable with respect to larger molecules and it is impossible to predict the effectiveness of particular catalytic materials. In general, the vapor phase conversion of acetals to vinyl ethers occurs in the temperature range above 200° C. At this temperature, however, vinyl allyl ether is readily isomerized to form 1-pentenal. In most instances, it is impossible to produce vinyl allyl ether in any yields and the best that can be expected, on the basis of the prior art, is the production of the desired product in extremely low yields. Accordingly, heretofore, the vapor phase catalytic conversion of diallyl acetal to vinyl allyl ether has not been tried and would not be expected to be of any utility.

The limitations thus inherent in the vapor phase synthesis of vinyl allyl ether is usually avoided by carrying out the reaction in the liquid phase as described by Paul, et al., supra, Hurd and Pollack, supra, by Shostakovskii, et al., "Indirect Vinylation of Aliphatic Alcohols," 1952 Izvest. Akad. Nauk. S.S.S.R., Otdel, Khim. Nauk 1099–1104 and by the processes described in U.S. Pats. 3,021,373 and 2,546,431 and in British Pats. 709,106 and 838,020. Typical of processes of this type is the process described by Montagne and Hurd in U.S. Pat. 3,021,373, Feb. 13, 1962. In this process, the acetal is catalytically converted to the vinyl ether in the liquid phase at temperatures from 75 to 225° C. under suitable pressure. The vinyl ether formed in the liquid phase is vaporized at the operating temperature and pressure and removed immediately from the reaction vessel. This approach permits high yields of the desired vinyl eher from the acetal but requires very close and careful control of the reaction conditions and specially designed reaction equipment to maintain the necessary control.

It has now been discovered that by using certain catalysts and operating conditions vinyl allyl ether can be produced in commercially attractive yields by the vapor-phase conversion of the diallyl acetal to vinyl allyl ether. It is, accordingly, a principal object of this invention to provide an improved process for producing vinyl allyl ether.

SUMMARY OF THE INVENTION

Vinyl allyl ether is produced according to the process of this invention by contacting diallyl acetal with selected catalysts at temperature below about 200° C. The surfaces found to catalyze the reaction include silica gel, molecular sieves, aluminum phosphate, charcoal, alumina, and disodium phosphate. The useable temperature range is from about 100° C. to about 200° C. but the preferred temperature range is from about 125° C. to about 175° C. Catalyst contact times suitable for this reaction are largely dependent upon the catalyst and the operating temperature but may vary up to about 40 seconds or more. Catalyst contact times from less than 1 second to about 20 seconds are preferred. Accordingly, the object of this invention is to provide an improved process for producing high yields of vinyl allyl ether by catalytic conversion of diallyl acetal without the formation of large amounts of pentenal as an impurity.

Another object of the invention is to provide an improved process for converting diallyl acetal to vinyl allyl ether.

A more specific object of the invention is to provide selected catalyst and operating conditions for producing high yields of vinyl allyl ether by catalytic conversion of diallyl acetal.

The processes described in the specification constitute additional and non-limiting objects of the invention.

Other objects of the invention will be apparent from the specification which follows.

DESCRIPTION OF THE PREFERRED EMBODIMENTS

Figure 1:
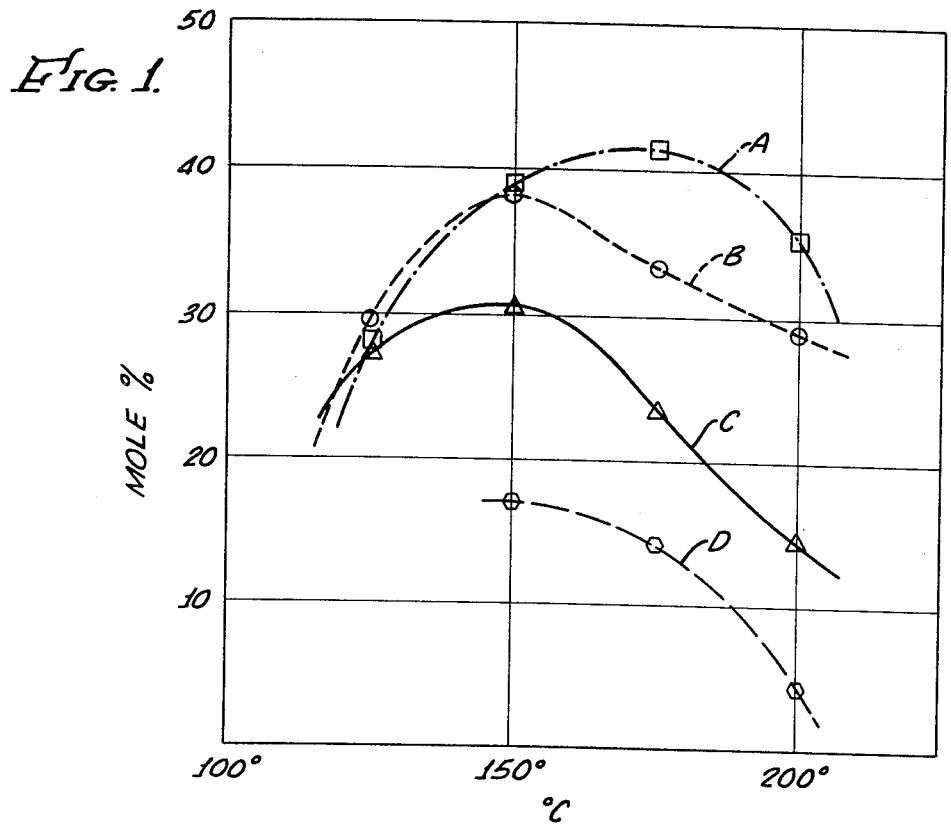
FIG. 1 is a graphic illustration of experimental data illustrating the effect of temperature and catalyst contact time on the production of vinyl allyl ether by the catalytic conversion of diallyl acetal using silica gel as the catalyst.

Vinyl allyl ether is known to be a valuable chemical intermediate and monomer and, therefore, the purpose of the project leading to the present invention was to develop an economically feasible method for producing vinyl allyl ether in commercial quantities. Many methods have been proposed in the prior art for producing vinyl allyl ether; however, as indicated in the foregoing discussion, all of the known methods suffer from one or more disadvantages which make them either unfeasible or unattractive as commercial methods for producing this valuable chemical. Most of the processes described in the prior art involve batch conversion of relatively expensive reactants to produce the vinyl allyl ether. Trans-esterification processes and Grignard aype proceesses are quite satisfactory for producing small quantities of vinyl allyl ether in the laboratory. Processes of this type, however, are commercially unattractive because of the high cost of the reactant ingredients and the waste of expensive reactants and other chemicals. It is, in addition, difficult to scale up batch reactions of this type to a commercial scale. The development of continuous processes for producing vinyl allyl ether, therefore, has long been recognized as an important object in the research in this area of technology.

The only potentially commercially feasible method for producing vinyl ethers of this class of which we are aware is described by Montagne and Hurd in U.S. Pat. No. 3,021,373. This patent describes a continuous process for producing vinyl allyl ether involving the critical control of the reaction pressure and temperature, the feed rate, removal rate, etc. Technically, this process is probably quite feasible but because of the specialized equipment and sensitive operating conditions, the process is inherently relatively expensive. The delicate balance of operating conditions results from the necessity, in the Montagne and Hurd process, of carrying out the reaction in the liquid phase and, simultaneously, removing the products in the vapor phase.

The direct vapor phase conversion of diallyl acetal to vinyl allyl ether has, heretofore, been regarded as technically impossible or, at least, commercially infeasible because of the strong tendency of the products to isomerize to 1-pentene aldehyde. It is known, for example, that at temperatures above about 200° C. vinyl allyl ether readily isomerizes to form the pentenal. In addition to reducing the net yield of vinyl allyl ether, this reaction contaminates the end product. Indeed, the teachings of the prior art suggest that if the temperature of the reaction were raised sufficiently high to produce vinyl allyl ether in attractive yields the major product, because of the pentenal isomerization, would be 1-pentenal, rather than vinyl allyl ether.

The selection of catalysts which would be effective to convert diallyl acetal to vinyl allyl ether-1-pentenal conversion temperature constituted the primary inquiry in the experiments leading to this invention. Since no vapor phase conversion of dialyl acetal to the vinyl ether has, to our knowledge, heretofore been attempted because of the problems previously discussed, and because of the unpredictability of catalyst effectiveness in acetal conversions generally, the prior art was of little help in selecting catalysts having potential applicability in the conversion of diallyl acetal to vinyl allyl ether. Obviously, virtually every known catalytic material was potentially a candidate for carrying out the desired reaction but, equally obviously, it was impractical to try each known catalyst.

Bramwych and Mugdan, British Pat. 603,471, reported that acetals are converted to vinyl ethers by thermal disassociation in the vapor phase in the presence of strong mineral acid and the process of Montagne and Hirsch, U.S. Pat. 3,021,373 suggested the use of acid catalyst. Sulfuric acid supported on silica gel, however, produced only traces of the vinyl allyl ether at low temperatures and none at higher temperatures.

Zvonkova, et al., "Synthesis of Substituted Vinyl Ethers in the Aliphatic Series," 34 Zh. Obshch. Khim 3659–62 (1964). and Cabanac, supra, suggested that metal oxides may possibly serve to catalyze the reaction. Accordingly, aluminum oxide, fused (Alundum) and unfused (alumina) were evaluated. The fused aluminum oxide (Alundum) was completely unsuccessful as a conversion catalyst and the unfused (alumina) catalyst was only moderately successful as a diallyl acetal conversion catalyst.

Glass beads had no catalytic action in the reaction of this process.

On the other hand, the relatively basic disodium phosphate is an effective conversion catalyst. Aluminum phosphate, charcoal, and molecular sieves were also found to be effective for converting diallyl acetal to vinyl allyl ether below 200° C.

Silica gel was found to be highly effective as a diallyl acetal conversion catalyst below 200° C. while silica gel containing about 1 percent $Na_2O$ gave only very low conversions to the vinyl allyl ether.

These experiments confirmed the prior art inplication that there is apparently no meaningful criterion by which the effectiveness of a catalyst for allyl acetal conversion to vinyl allyl ether can be predicted. In the present state of the art, one must simply try representative catalysts to determine the potential effectiveness for this reaction.

For the reasons previously indicated, the reaction must be conducted at temperatures below about 200° C. to prevent the undue formation of 1-pentenal either as a contaminant in the vinyl ether or as a major product. Silica gel, molecular sieves, aluminum phosphate, charcoal, alumina and disodium phosphate are catalytically effective at these temperatures. Over these catalysts the products, allyl vinyl ether and allyl alcohol, are in rapid thermodynamic equilibrium with the acetal. Thus, the product distriubtion can be controlled by adjusting appropriate variables, i.e., temperature, pressure, dilution in an inert carrier gas, etc. The reaction must be conducted at temperatures of at least about 100° C. and, for commercially attractive yields, the reaction is conducted in the range of about 125° to 175° C.

The optimum catalyst contact time, is, of course, dependent upon the type of catalyst and, in addition, is a function of the operating temperature. Catalyst contact times of from about 1 second to about 20 seconds are most satisfactory although shorter contact times may be used and contact times of 40 seconds or more may also be used, although there is an increased production of 1-pentenal with longer contact times, particularly at higher temperatures.

The acetal vapor can be fed into the reactor either neat or, preferably, with an inert purge gas, such as nitrogen, helium, etc. The catalyst contact time can be controlled by using either the length of the catalyst bed (catalyst volume) or the rate of purge gas flow, or a combination of both. Since the reactants and the products are in the vapor phase, no special handling equipment is required. The reactants are simply fed into the entry of the reaction tube, containing the catalyst, and the reaction products are removed from the exit end of the reaction tube, cooled and separated by fractionation, etc.

In the experiments conducted in accordance with this invention, product analysis was by gas chromatography, mass spectrography, and infrared spectrometry, as well as conventional wet analytical methods.

Experimental data and conditions and yield data are shown for a series of experiments exemplifying this reaction in Table I.

TABLE I.—CATALYTIC CONVERSION OF DIALLYL ACETAL TO VINYL ALLYL ETHER

| Run number | Catalyst | Temp., °C. | Contact time, sec. | Diallyl[1] acetal | Vinyl[1] allyl ether | Allyl alcohol | 1-pentene aldehyde | Acetaldehyde | $H_2O$ |
|---|---|---|---|---|---|---|---|---|---|
| 38-1, 2 | $SiO_2$[3] (60 cc.) | 127 | [3] 10.8 | 26.9 | 27.4 | 37.0 | 0.8 | 3.4 | 0.2 |
| 38-3, 4 | $SiO_2$[3] (30 cc.) | 124 | [3] 5.5 | 33.8 | 29.6 | 34.0 | 0.5 | 2.2 | 0.0 |
| 38-5, 6 | $SiO_2$[3] (15 cc.) | 125 | [3] 2.7 | 38.2 | 28.0 | 32.0 | 0.0 | 1.8 | 0.0 |
| 33-1, 2 | $SiO_2$[3] (15 cc.) | 152 | [3] 2.8 | 11.7 | 38.7 | 45.0 | 0.6 | 2.6 | 0.2 |
| 33-3 | $SiO_2$[3] (15 cc.) | 175 | [3] 2.7 | 4.5 | 41.3 | 47.2 | 3.6 | 2.8 | 0.1 |
| 33-5, 6 | $SiO_2$[3] (15 cc.) | 200 | [3] 2.6 | 1.6 | 35.8 | 47.7 | 9.0 | 2.0 | 3.6 |
| 31-2, 3 | $SiO_2$[3] (30 cc.) | 152 | [3] 5.7 | 7.5 | 38.3 | 48.1 | 2.6 | 2.6 | 0.4 |
| 31-4, 5 | $SiO_2$[3] (30 cc.) | 173 | [3] 5.4 | 3.1 | 33.2 | 50.5 | 8.4 | 3.1 | 1.3 |
| 31-6, 7 | $SiO_2$[3] (30 cc.) | 197 | [3] 5.1 | 0.9 | 29.4 | 48.5 | 15.7 | 3.1 | 0.8 |
| 36-1 | $SiO_2$[3] (15 cc.) | 147 | [4] 10.6 | 30.9 | 28.0 | 37.2 | 0.0 | 3.5 | 0.0 |
| 36-2 | $SiO_2$[3] (15 cc.) | 174 | [4] 10.0 | 12.1 | 35.3 | 44.4 | 3.8 | 3.1 | 0.0 |
| 36-3 | $SiO_2$[3] (15 cc.) | 199 | [4] 9.6 | 5.1 | 34.2 | 36.7 | 9.7 | 3.1 | 0.0 |
| 32-2, 3 | $SiO_2$[3] (60 cc.) | 150 | [3] 11.4 | 7.9 | 30.4 | 50.8 | 5.0 | 3.9 | 0.8 |
| 32-4, 5 | $SiO_2$[3] (60 cc.) | 175 | [3] 10.8 | 2.4 | 23.5 | 53.0 | 15.3 | 4.5 | 0.8 |
| 32-7, 8 | $SiO_2$[3] (60 cc.) | 199 | [3] 10.2 | 0.5 | 14.8 | 51.4 | 26.8 | 4.2 | 0.9 |
| 34-1 | $SiO_2$[3] (30 cc.) | 151 | [4] 21.3 | 18.1 | 28.4 | 45.6 | 2.1 | 4.6 | 0.2 |
| 34-2 | $SiO_2$[3] (30 cc.) | 176 | [4] 20.1 | 7.8 | 25.5 | 49.9 | 10.5 | 5.2 | 1.0 |
| 34-3 | $SiO_2$[3] (30 cc.) | 199 | [4] 19.1 | 2.8 | 21.7 | 50.0 | 19.4 | 3.9 | 0.7 |
| 35-1 | $SiO_2$[5] (60 cc.) | 151 | 42.6 | [4] 22.9 | 17.1 | 49.4 | 4.2 | 6.2 | 0.0 |
| 35-2 | $SiO_2$[5] (60 cc.) | 176 | 40.2 | [4] 7.9 | 14.4 | 54.4 | 15.3 | 7.8 | 0.1 |
| 35-3 | $SiO_2$[5] (60 cc.) | 199 | 38.2 | [4] 1.3 | 4.0 | 55.4 | 30.6 | 7.5 | 0.9 |
| 37-1, 2 | $SiO_2$[5] (30 cc.) | 125 | 1.5 | [5] 23.0 | 36.9 | 37.0 | 0.0 | 2.1 | 1.0 |
| 37-3, 4 | $SiO_2$[5] (30 cc.) | 148 | 1.4 | [5] 8.0 | 44.3 | 45.0 | 0.2 | 1.8 | 0.6 |
| 37-5, 6 | $SiO_2$[5] (30 cc.) | 175 | 1.4 | [5] 2.0 | 45.0 | 47.2 | 2.9 | 1.8 | 1.0 |
| 37-7, 8 | $SiO_2$[5] (30 cc.) | 198 | 1.3 | [5] 0.7 | 42.2 | 45.8 | 7.9 | 2.2 | 1.3 |
| 40-1 | $H_2SO_4$ on $SiO_2$ (15 cc.) | 126 | [3] 2.8 | 21.2 | 1.0 | 71.2 | 0.3 | 5.4 | 0.0 |
| 40-2 | $H_2SO_4$ on $SiO_2$ (15 cc.) | 148 | [3] 2.7 | 44.2 | 0.0 | 47.5 | 1.6 | 6.5 | 0.0 |
| 40-3 | $H_2SO_4$ on $SiO_2$ (15 cc.) | 176 | [3] 2.6 | 44.3 | 0.0 | 44.6 | 2.9 | 8.0 | 0.0 |
| 41-1, 2 | $AlPO_4$ (15 cc.) | 128 | [3] 2.8 | 40.7 | 15.3 | 39.0 | 1.5 | 3.3 | 0.0 |
| 41-3, 4 | $AlPO_4$ (15 cc.) | 151 | [3] 2.7 | 29.4 | 20.3 | 40.6 | 1.1 | 7.9 | 0.7 |
| 41-5 | $AlPO_4$ (15 cc.) | 175 | [3] 2.6 | 11.3 | 31.4 | 47.5 | 1.6 | 7.8 | 0.0 |
| 42-1 | Charcoal[6] (15 cc.) | 124 | [3] 2.8 | 2.9 | 0.5 | 91.5 | 0.4 | 3.5 | 0.0 |
| 42-3 | do | 175 | [3] 2.6 | 8.1 | 31.9 | 53.2 | 2.9 | 3.7 | 0.0 |
| 43-1 | Alundum (30 cc.) | 128 | [3] 5.4 | 97.1 | 0.0 | 0.0 | 1.5 | 0.8 | 0.0 |
| 43-2 | do | 150 | [3] 5.4 | 97.6 | 0.0 | 0.0 | 1.3 | 0.7 | 0.1 |
| 43-3 | do | 175 | [3] 5.1 | 97.0 | 0.0 | 0.0 | 1.1 | 0.6 | 1.0 |
| 46-1 | $Na_2HPO_4$ (30 cc.) | 173 | 10.0 | 19.0 | 36.0 | 44.0 | 0.0 | 0.0 | 0.0 |
| 46-2 | $Na_2HPO_4$ (30 cc.) | 173 | 30.0 | 34.0 | 31.0 | 34.0 | 1.0 | 1.0 | 0.0 |
| 46-3 | $Na_2HPO_4$ (30 cc.) | 248 | 10.0 | 2.0 | 35.0 | 56.0 | 10.0 | 1.0 | 0.0 |
| 46-4 | $Na_2HPO_4$ (30 cc.) | 248 | 30.0 | 2.0 | 19.0 | 50.0 | 27.0 | 1.0 | 1.0 |
| 45-1 | Glass beads (30 cc.) | 182 | 10.0 | 100.0 | | | | | |
| 45-2 | do | 241 | 10.0 | 100.0 | | | | | |
| 51-1 | 1% $Na_2D/SiO_2$ (30 cc.) | 174 | 30.0 | 83.8 | 4.2 | 4.7 | 1.7 | 0.5 | 4.5 |
| 51-2 | 1% $Na_2D/SiO_2$ (30 cc.) | 174 | 5.0 | 86.6 | 3.3 | 3.6 | 0.9 | 1.4 | 3.4 |
| 52-3 | Molecular sieves type 13X (30 cc.) | 150 | 10.0 | 23.3 | 35.2 | 38.8 | 1.2 | 1.1 | 0.4 |
| 52-7 | do | 150 | 2.0 | 5.4 | 45.6 | 47.7 | 0.3 | 1.0 | 0.0 |
| 52-8 | do | 150 | 1.0 | 3.5 | 47.2 | 48.0 | 0.0 | 0.4 | 0.9 |
| 52-6 | do | 175 | 10.0 | 9.6 | 41.3 | 46.1 | 1.8 | 1.2 | 0.0 |
| 52-5 | do | 175 | 2.0 | 1.9 | 45.0 | 49.3 | 1.3 | 2.0 | 0.5 |
| 91-07 | $Z_2O$ (98%)+$Al_2O_3$(2%) | 175 | 5.0 | | Low | | | Present | |

[1] Unconverted.
[2] Davidson Grade 70 silica gel.
[3] 2.0 cc./hr. diallyl acetal, 200 cc./min. He.
[4] 2.0 cc./hr. diallyl acetal, 50 cc./min. He.
[5] 2.0 cc./hr. diallyl acetal, 800 cc./min. He.
[6] Coconut charcoal, acid washed.

As evident from the above tables, with molecular sieve Type 13X, the temperature range is from 150° to 175° C. and the contact time is from 1 to 10 seconds.

As the foregoing data indicate, higher temperatures and longer contact times tend to result in the undesirable production of 1-pentenal. Lower temperatures yield smaller quantities of 1-pentenal but, in general, also give lower yields of vinyl allyl ether. Operating temperatures up to 200° C. may be used but temperatures from about 125° C. to about 175° C. are preferred.

Figure 2:
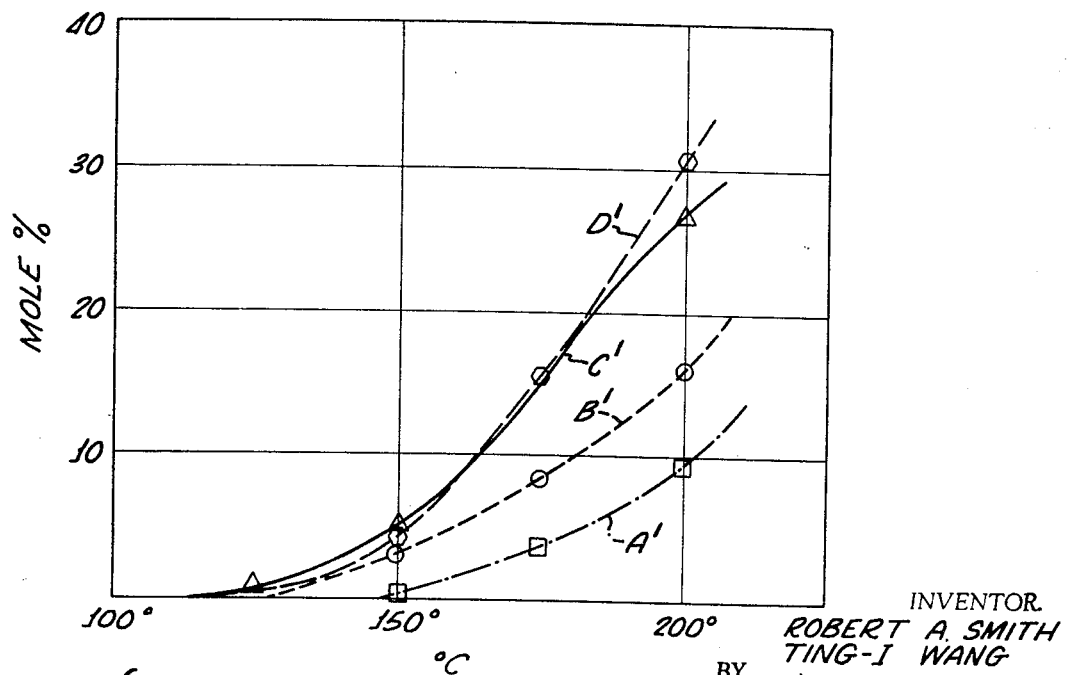
FIG. 2 is a graphic illustration of the experimental data corresponding to that of FIG. 1 showing the production of 1-pentenal impurity in a process for converting diallyl acetal to vinyl allyl ether using silica gel as a catalyst; Curves A, B, C, and D of FIG. 2 correspond to the respective lettered curves of FIG. 1.

The effect of temperature and catalyst contact time on the conversion of diallyl acetal to vinyl allyl ether and the production of 1-pentenal are illustrated, respectively, in FIGS. 1 and 2.

FIG. 1 shows the effect of temperature and residence time on the yield of vinyl allyl ether from diallyl acetal over Davidson Grade 70 silica gel catalyst. Curve A shows the temperature effect on the conversion of the acetal to the vinyl ether using 15 cc. of silica gel catalyst and a contact time of 2.5–2.7 seconds. Curve B shows the effect of temperature on the production of vinyl allyl ether using 30 cc. of catalyst and a contact time of 5.1–5.7 seconds. Curve C shows the effect of temperature on vinyl ether production using 60 cc. of catalyst and a contact time of 9.6–10.8 seconds. Curve D shows the effect of vinyl allyl ether production using 60 cc. of catalyst and contact times of 38.2–42.6 seconds. Vinyl allyl ether production is shown in mole percent of the effluent from the catalyst bed.

Two effects are easily recognized from these curves. First, it is noted that curves A, B and C, and presumably curve D if a lower temperature data point were available, shows a yield maxima at a temperature below 200° C. with a yield maxima at a temperature below 200° C. with yields decreasing as the temperature increases and sharply decreasing as the temperature approaches 100° C. Secondly, the yield maxima occurs at lower temperatures as the catalyst contact time is increased. In all cases, optimum yields are obtainable in the temperature range of about 125° C. to about 175° C. although, with lower contact times, economically attractive yields are obtained at temperatures approaching 200° C.

As previously indicated, however, the production of 1-pentenal not only reduces the net yield of vinyl allyl ether but this compound constitutes an undesirable impurity in the product. The production of this impurity component, 1-pentenal, as a function of temperature and catalyst contact time is shown in FIG. 2. Curves A, B, C and D of FIG. 2 correspond experimentally to curves A, B, C, and D, respectively, of FIG. 1.

Two effects can be observed in the data illustrated in FIG. 2. First, at all residence times there is a marked increase in 1-pentenal impurity production as the temperature is increased above 150° toward 200° C. Secondly, the rate of impurity production increases as a function of temperature and the absolute value of impurity production increases as the catalyst contact time increases. For example, even at 200° C. with a short contact time, about 2.5 seconds, less than 10% of the product is 1-pentenal. With contact times as high as 10–11 seconds, however, more than 25% of the product is the 1-pentenal impurity. In the latter case, the "impurity" is actually present in approximately twice the concentration of the desired component.

Referring again to FIG. 1, it will be observed that the highest yield of the vinyl allyl ether occurs with the shortest contact time, of the data illustrated. There is, therefore, no advantage, in terms of vinyl ether yield to using long contact times and, in view of the higher production of the impurity 1-pentenal, shorter contact times are definitely to be desired.

It will also be noted that there is only minor improvement in vinyl ether yield, using the short contact time, between 150 and 175° C. while there is a modest but significant increase in the production of the impurity 1-pentenal over the same temperature range. For optimum vinyl allyl ether production with minimum 1-pentenal production, therefore, using silica gel as the catalyst, a short contact time, under about 3 or 4 seconds and an operating temperature in the vicinity of about 150° C. is suggested. Obviously, depending upon the precise nature of the catalyst, the size and type of reactor, and other variables, optimum temperatures and contact times may vary but, based upon the foregoing teachings, selection of conditions may be made without departing from the invention.

In presenting these data, it is not our intention to limit the invention specifically to the optimum conditions described herein since, as indicated, optimum operating conditions will depend upon the type of system involved. However, these data, based upon laboratory scale experiments are sufficient to teach the determination of optimum operating conditions and the selection of suitable catalysts, among the class tested. It is, therefore, contemplated that variations may be made from the embodiments described herein for illustration without departing from the spirit and the scope of the invention as defined in the following claim.

What is claimed is:

1. The process of producing vinyl allyl ether comprising: contacting diallyl acetal with a Type 13X molecular sieve catalyst in the vapor phase at temperatures in the range of 150° to 175° C. and at contact times of from 1 to 10 seconds.

References Cited

UNITED STATES PATENTS

| 3,033,778 | 5/1962 | Frilette | 260—62 XR |
| 3,036,134 | 5/1962 | Mattox | 260—61 XR |
| 3,140,322 | 7/1964 | Frilette et al. | 260—641 X |
| 1,902,169 | 3/1933 | Herrmann et al. | 260—614 |
| 1,931,858 | 10/1933 | Baur | 260—614 |
| 3,021,373 | 2/1962 | Montasna et al. | 260—614 |

FOREIGN PATENTS

| 532,069 | 10/1956 | Canada | 260—614 |
| 681,059 | 10/1952 | Great Britain | 260—614 |
| 763,066 | 12/1956 | Great Britain | 260—614 |
| 41/5,376 | 3/1966 | Japan | 260—614 |

OTHER REFERENCES

Flaig, Ann. Der Chemie, 568, pp. 1–5, 18–24 (1950).

HOWARD T. MARS, Primary Examiner

U.S. Cl. X.R.

260—632 B, 601 R